(12) United States Patent
Rusu et al.

(10) Patent No.: US 7,669,069 B2
(45) Date of Patent: Feb. 23, 2010

(54) CONTROL OF LINK SUPPLY POWER BASED ON LINK PORT MODE

(75) Inventors: Stefan Rusu, Sunnyvale, CA (US); Harry Muljono, Union City, CA (US); Alex Kuperman, Campbell, CA (US)

(73) Assignee: Intel Corporation, Santa Clara, CA (US)

( * ) Notice: Subject to any disclaimer, the term of this patent is extended or adjusted under 35 U.S.C. 154(b) by 508 days.

(21) Appl. No.: 11/477,186

(22) Filed: Jun. 28, 2006

(65) Prior Publication Data

US 2008/0059815 A1    Mar. 6, 2008

(51) Int. Cl.
*G06F 1/32*    (2006.01)
(52) U.S. Cl. .................................. 713/323; 713/320
(58) Field of Classification Search .................. 713/300, 713/320, 323
See application file for complete search history.

(56) References Cited

U.S. PATENT DOCUMENTS

| 6,055,641 | A | * | 4/2000 | Konaka et al. | 713/320 |
| 6,880,095 | B2 | * | 4/2005 | Cromer et al. | 713/300 |
| 2005/0144488 | A1 | * | 6/2005 | Lee et al. | 713/300 |
| 2005/0144494 | A1 | * | 6/2005 | Bonavita et al. | 713/320 |
| 2007/0156370 | A1 | * | 7/2007 | White et al. | 702/132 |

\* cited by examiner

*Primary Examiner*—Chun Cao
(74) *Attorney, Agent, or Firm*—Buckley, Maschoff & Talwalkar LLC

(57) ABSTRACT

A system may include detection of a logical mode of a link port, and changing of a link supply power provided to the link port based on the detected logical mode. Detection of the logical mode may include a determination of whether the link port is terminated by a partner link port. If the link port is not terminated, the link supply power may be reduced to a value that does not preserve logic states of a plurality of link port elements, and, if the link port is terminated, the link supply power may be maintained substantially at $V_{cc}$.

8 Claims, 11 Drawing Sheets

CONTROL OF LINK SUPPLY POWER BASED ON LINK PORT MODE

BACKGROUND

A link port may be generally defined as an electrical interface connecting a first processing agent to a second processing agent. A link port allows the first processing agent to transmit data to and receive data from the second processing agent. Typically, a link port includes a transmitter circuit and a receiver circuit, which may or may not share one or more common electrical elements.

The transmitter circuit and receiver circuit of a link port may consume significant DC current. For example, a transmitter circuit of a conventional link port may consume 16 to 24 milliamps in order to maintain 400 to 600 millivolts of voltage swing. Significant current is consumed whether or not the link port is active, inactive, or disabled. Much of the consumed current is attributable to leakage current of their constituent circuit elements.

DETAILED DESCRIPTION

Figure 1:
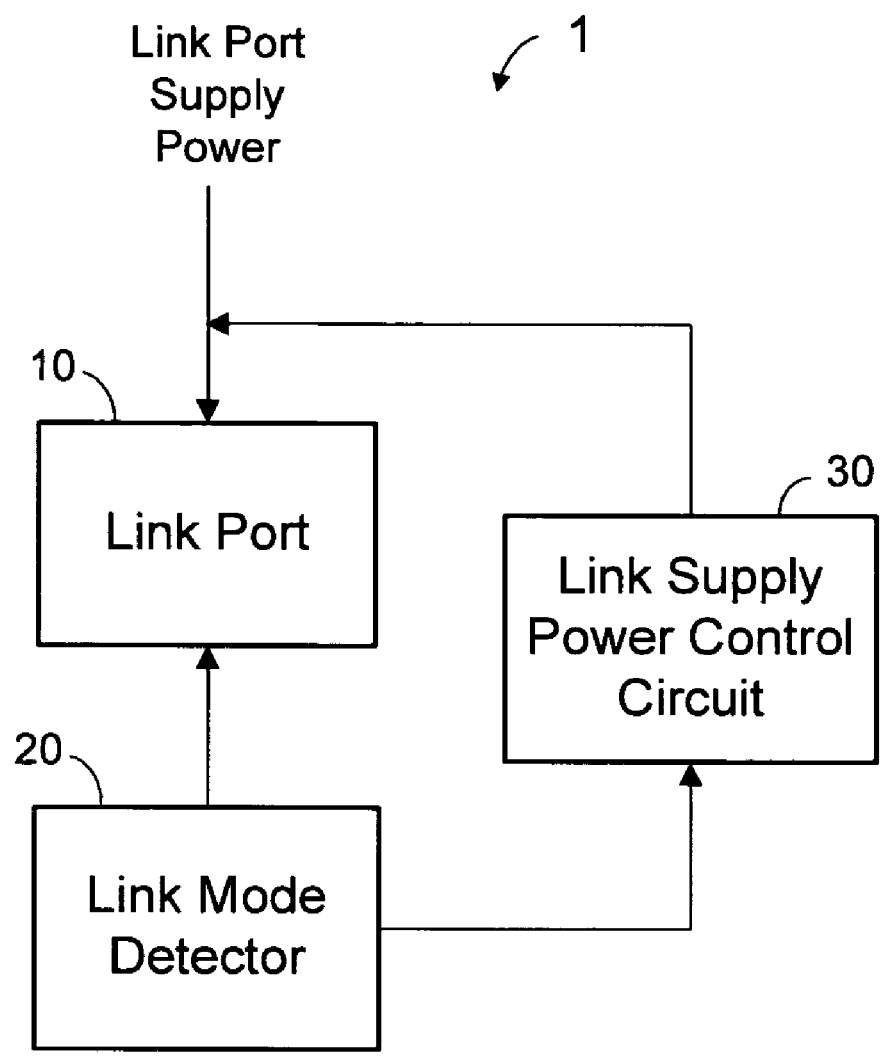
FIG. 1 is a block diagram of a system according to some embodiments.

FIG. 1 is a block diagram of a system according to some embodiments. System 1 may be used to control the power supplied to a link port. Such control may improve the power consumption characteristics of such a link port. System 1 includes link port 10, link mode detector 20, and link supply power control circuit 30.

Link port 10 may comprise any interface including electrical elements for communicating with a partner link port. The electrical elements may include a receiver and a transmitter. Link port 10 may provide serial and/or parallel communication, and may comprise an element of an integrated circuit, including but not limited to a microprocessor, a chipset, a memory subsystem, and an I/O controller.

Link mode detector 20 may comprise any system to determine a logical mode of link port 10. Possible logical modes according to some embodiments include active, disabled, and sleep. Link mode detector 20 may determine that link port 10 is disabled if link mode detector determines that link port 10 is not terminated by a link port partner.

Link supply power control circuit 30 may change a link supply power provided to link port 10 based on a logical mode detected by link mode detector 20. For example, if the logical mode is "disabled", link supply power control circuit 30 may reduce the link supply power to a value that does not preserve logic states of two or more elements of link port 10. The reduced link supply power may equal zero or may exhibit a slight magnitude. In some embodiments, the link supply power is reduced to ~100 millivolts.

In other examples, link supply power control circuit 30 may, if the logical mode is "sleep", reduce the link supply power to a value that is less than the illustrated link power supply voltage but that nevertheless preserves logic states of two or more elements of link port 10. The link supply power and the thusly-reduced link supply power according to some embodiments reflect 1.1 volt and ~900 millivolts, respectively.

Reduction of the link supply power delivered to the power grid of a link port may reduce leakage current within the link port. Link supply power control circuit 30 may also or alternatively maintain the link supply power at 1.1 volt based on a detected logical mode according to some embodiments.

Figure 2:
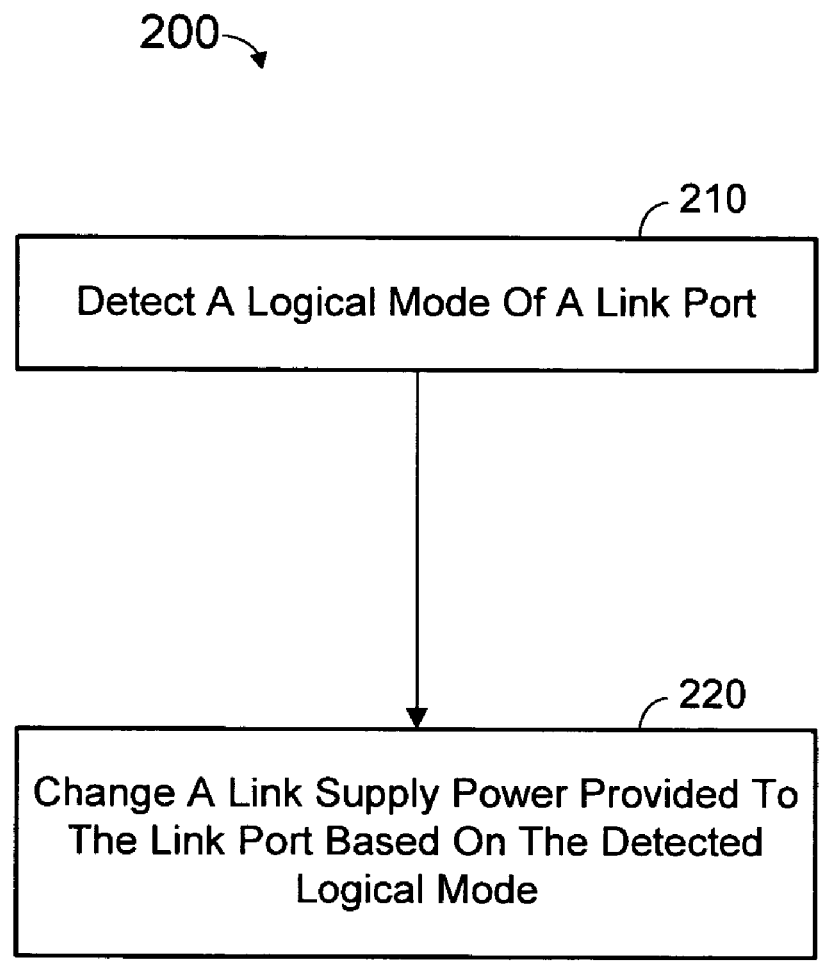
FIG. 2 is a diagram of a process according to some embodiments.

FIG. 2 is a diagram of a general process according to some embodiments. Process 200 may be executed by any combination of hardware and software elements, some of which may be located remote from one another. Some or all of process 200 may be executed manually. According to some embodiments, process 200 is performed by link mode detector 20 and link supply power control circuit 30 of FIG. 1.

Initially, a logical mode of a link port is detected at 210. The logical mode may indicate an operational state of the link port. In this regard, the link port may comprise a transmitter and/or a receiver. As mentioned above, the logical mode may comprise "active", "disabled or "sleep", but is not limited thereto. The logical mode may be detected via software, firmware and/or a hardware circuit such as that discussed below with respect to FIG. 7.

Next, at 220, a link supply power is changed based on the detected logical mode. The link supply power may be increased or reduced at 220. According to some embodiments of 220, a switch disposed between a supply power node and the link port is controlled to pass all, some, or no supply power from the node to the port. Some embodiments of process 200 may thereby improve the efficiency of link port power consumption by reducing leakage current within a link port.

Figure 3:
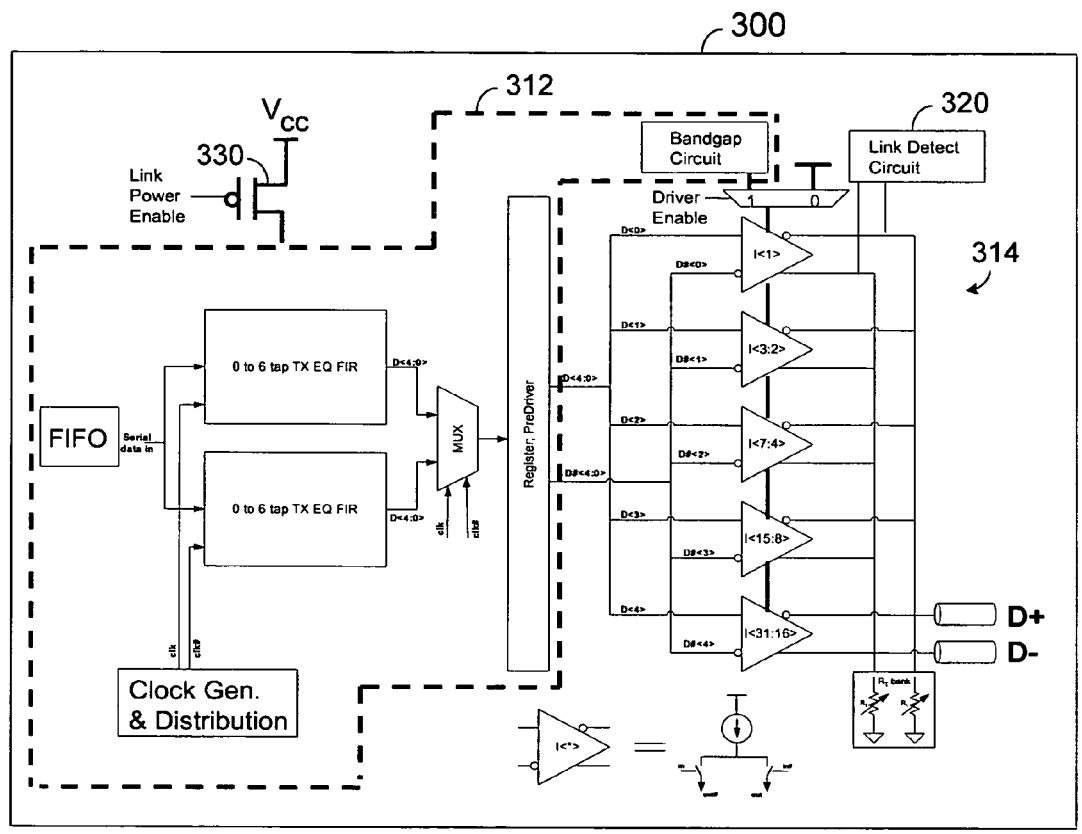
FIG. 3 is a schematic diagram of a link port transmitter according to some embodiments.

FIG. 3 is a schematic diagram of system 300 according to some embodiments. System 300 may comprise an implementation of system 1. System 300 includes a transmitter comprising digital transmitter elements 312 and analog transmitter elements 314 to transmit differential data signals D+ and D−, link detect circuit 320, and link supply power control circuit 330. Digital transmitter elements 312 may comprise an implementation of link port 10 of FIG. 1.

As shown, link power supply circuit 330 comprises a p-channel metal-oxide semiconductor transistor coupled to supply power node $V_{cc}$ and to digital transmitter elements 312. Other circuits and/or other transistor types may be used in some implementations of link power supply circuit 330. The illustrated link power enable signal determines a degree to which supply power $V_{cc}$ is provided to elements 312. For example, a low link power enable signal may open switch 330 and provide ~$V_{cc}$ to a power grid shared by elements 312. Conversely, a high signal may virtually close switch 330 and provide ~$V_{ss}$ to the power grid.

Figure 4:
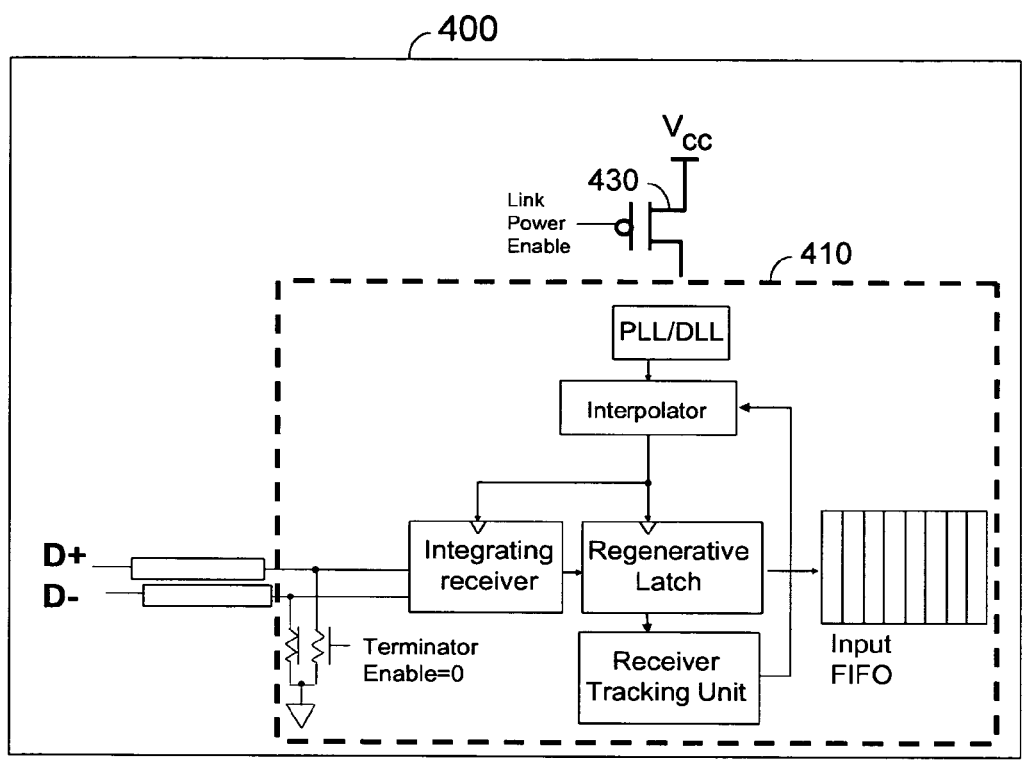
FIG. 4 is a schematic diagram of a link port receiver according to some embodiments.

FIG. 4 is a schematic diagram of system 400 according to some embodiments. System 400 may also comprise an implementation of system 1. System 400 includes receiver 410 to receive differential data signals D+ and D−, and link supply power control circuit 430. Receiver 410 may comprise an implementation of link port 10 of FIG. 1.

Link power supply circuit 430 comprises a p-channel metal-oxide semiconductor transistor coupled to supply power node $V_{cc}$ and to receiver 410, which is composed of digital elements. Again, other circuits and/or other transistor types may be used in some implementations of link power supply circuit 430, and the link power enable signal determines a degree to which supply power $V_{cc}$ is provided to receiver 410.

According to some embodiments, system 300 and system 400 comprise a single transceiver system. For example, system 300 and system 400 may be combined to implement system 1, with elements 312, 314 and 410 corresponding to link port 10, link detect circuit 320 corresponding to link mode detector 20, and circuits 330 and 430 corresponding to link supply power circuit 30. Moreover, circuits 330 and 430 may be implemented by a single transistor that is shared between system 300 and system 400.

Figure 5:
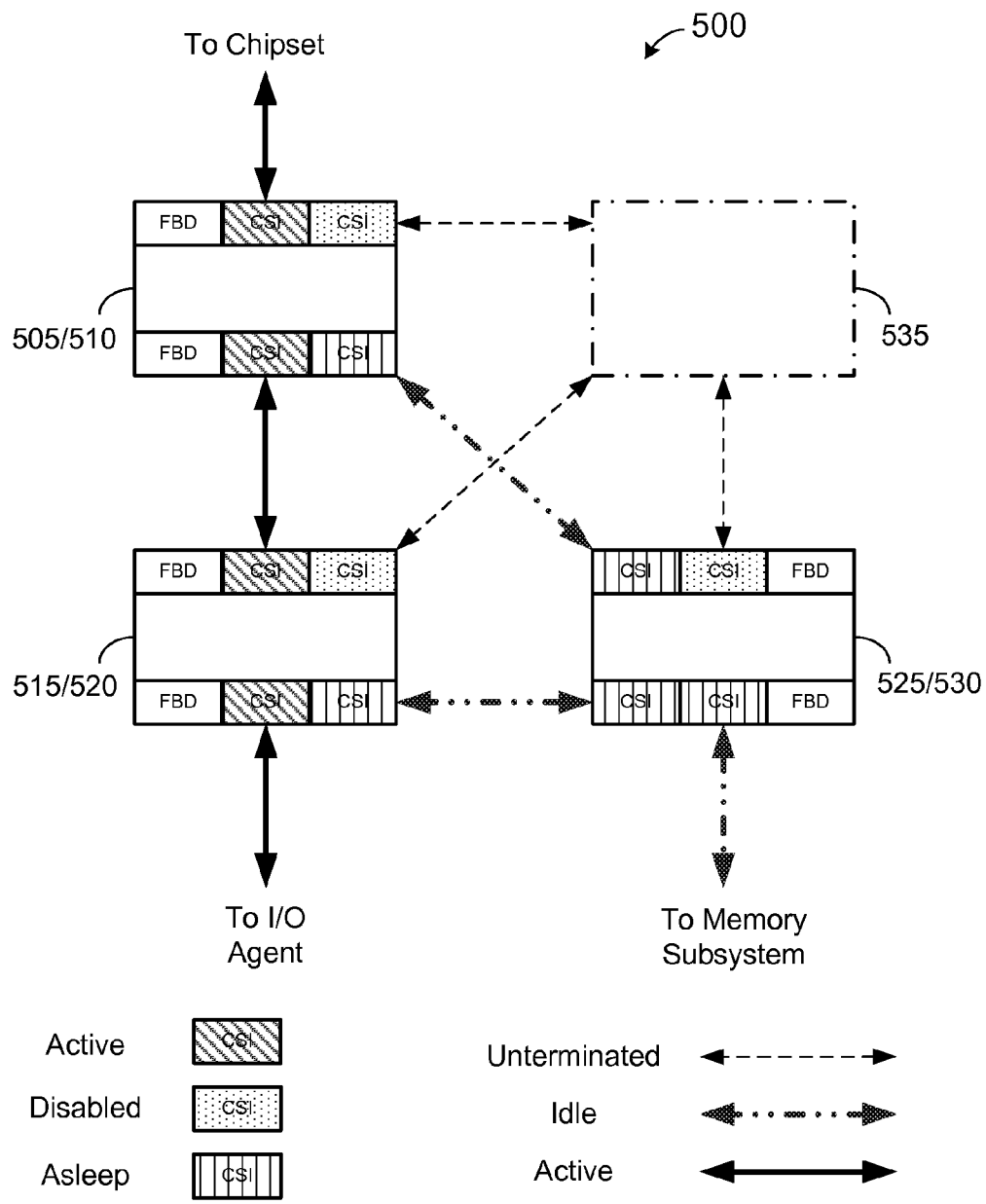
FIG. 5 is a block diagram of a system according to some embodiments.

FIG. 5 is a block diagram of hardware platform 500 to illustrate various logical modes of a link port. Hardware platform 500 reflects a multiprocessor architecture including processor sockets 505, 515, 525 and 535. Processor sockets 505, 515 and 525 are occupied by processors 510, 520 and 530, respectively, and socket 535 is unoccupied.

Each of processors 510, 520 and 530 includes four Common Specification Interface link ports and two Fully-Buffered Dual In-line Memory Module link ports. FIG. 5 illustrates a logical mode and a link state associated with each illustrated link port. FIG. 5 also indicates other integrated circuits or systems to which the illustrated link ports may be coupled.

Figure 6:
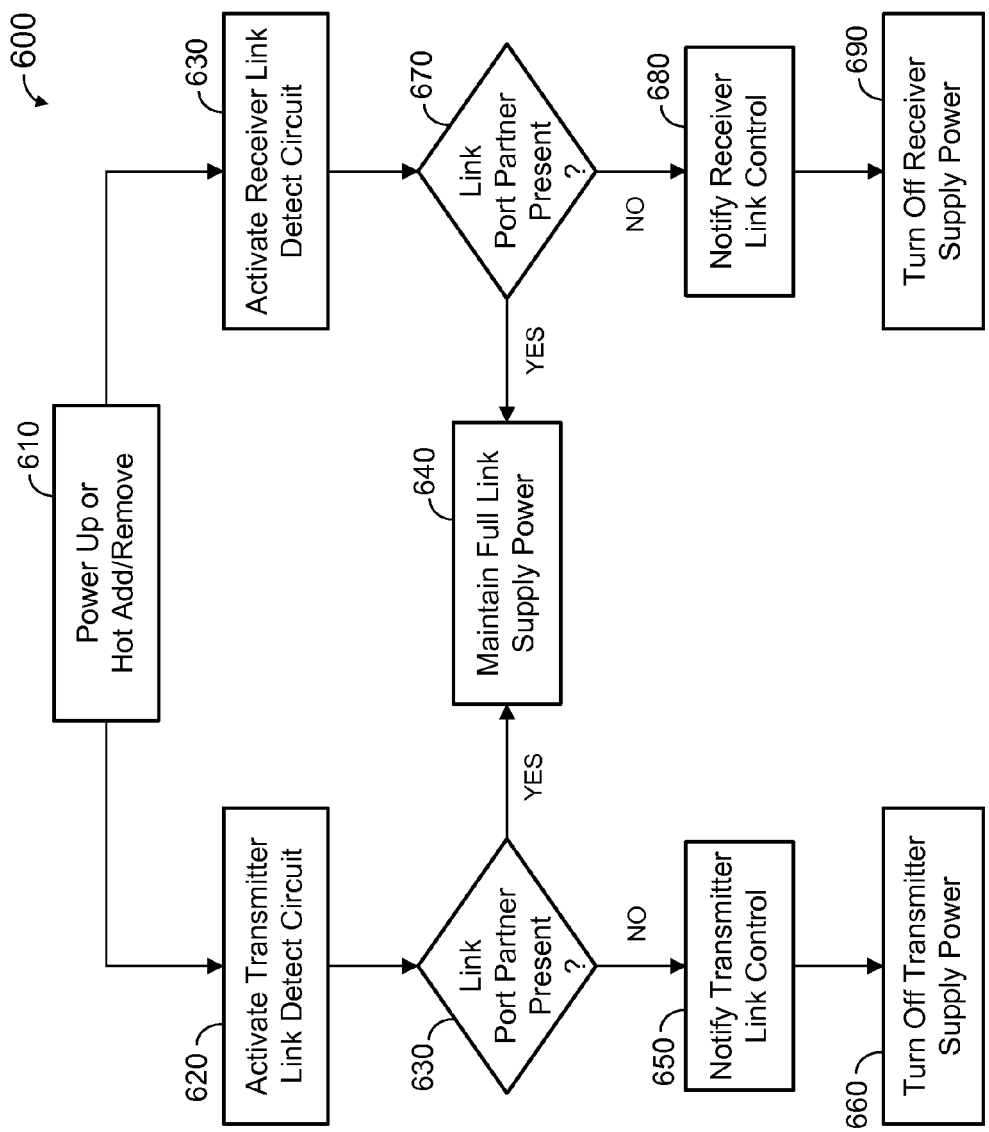
FIG. 6 is a diagram of a process according to some embodiments.

FIG. 6 comprises a flow diagram of process 600 according to some embodiments. Process 600 may be performed by any combination of the elements discussed herein and/or by any other suitable elements. Process 600 may be used to control a link supply power based on a detected logical mode.

A system including one or more link ports is powered-up at 610. Alternatively, a device including one or more link ports is hot-added to or hot-removed from a powered-up system at 610. In either case, flow branches to both of 620 and 630. A transmitter link detect circuit is activated at 620, and a receiver link detect circuit is activated at 630. The activated transmitter link detect circuit and receiver link detect circuit may comprise elements of a same link port.

Figure 7:
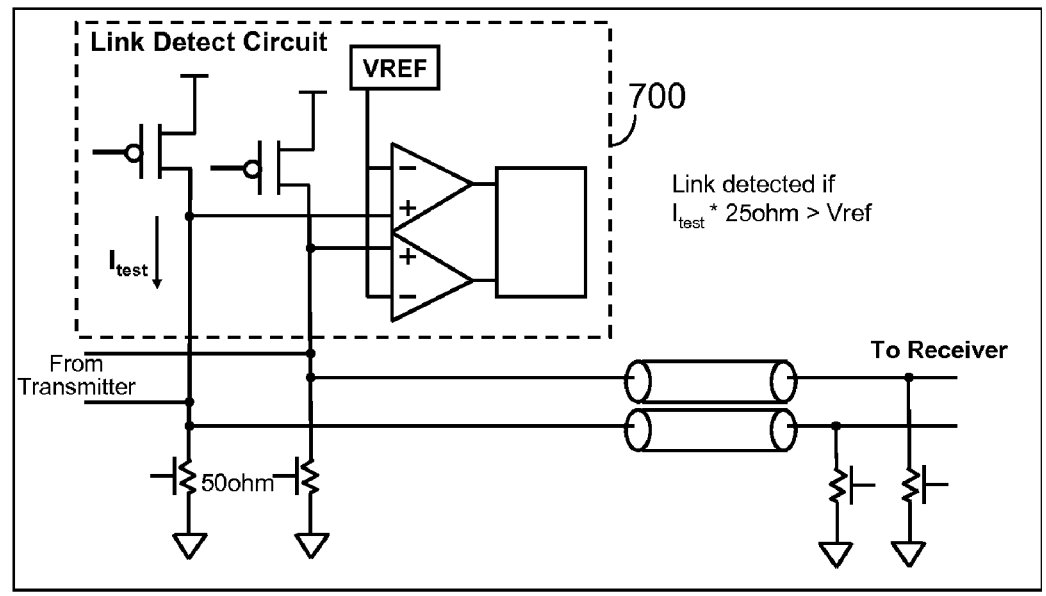
FIG. 7 is a schematic diagram of a detector according to some embodiments.

FIG. 7 illustrates link detect circuit 700 according to some embodiments. Link detect circuit comprises a transmitter link detect circuit 700 that may be activated in some embodiments of 620. Link detect circuit 700 may be used as a receiver link detect circuit in some embodiments. Circuit 700 is currently known to those in the art.

Continuing down the left side of process 600, the transmitter link detect circuit determines whether a link port partner is present at 630. If so, a full link supply power is maintained at 640. With reference to FIG. 3, circuit 330 may be closed at 640 to provide substantially all of $V_{cc}$ to elements 312.

If no link partner is present at 630, a transmitter link control is notified at 650. The transmitter link control may comprise a state machine that receives input from the link detect circuit and controls the transmitter supply power based thereon. Accordingly, at 660, the transmitter link control may turn off the transmitter supply power.

Some embodiments of 660 comprise controlling the link power enable signal of FIG. 3 to substantially open circuit 330. Such an action may allow some current to flow from supply power node $V_{cc}$ to elements 312. However, such current is not sufficient to preserve logical states of elements 312. In some embodiments, $V_{cc}$ is 1.1V and the "off" link supply power is ~100 millivolts.

The right-hand side of process 600 may be executed in parallel with the left-hand side. At 630, a receiver link detect circuit determines whether a link port partner is present and, if so, a full link supply power is maintained at 640. Referring to FIG. 4, circuit 430 may be closed at 640 to provide substantially all of V.sub.cc to receiver 410.

If no link partner is present at 670, a receiver link control is notified at 680. The receiver link control may then turn off the receiver supply power at 690 as described with respect to 660. Process 600 may be executed for each link port of a platform in response to power-up, hot-add and/or hot-removal.

Figure 8:
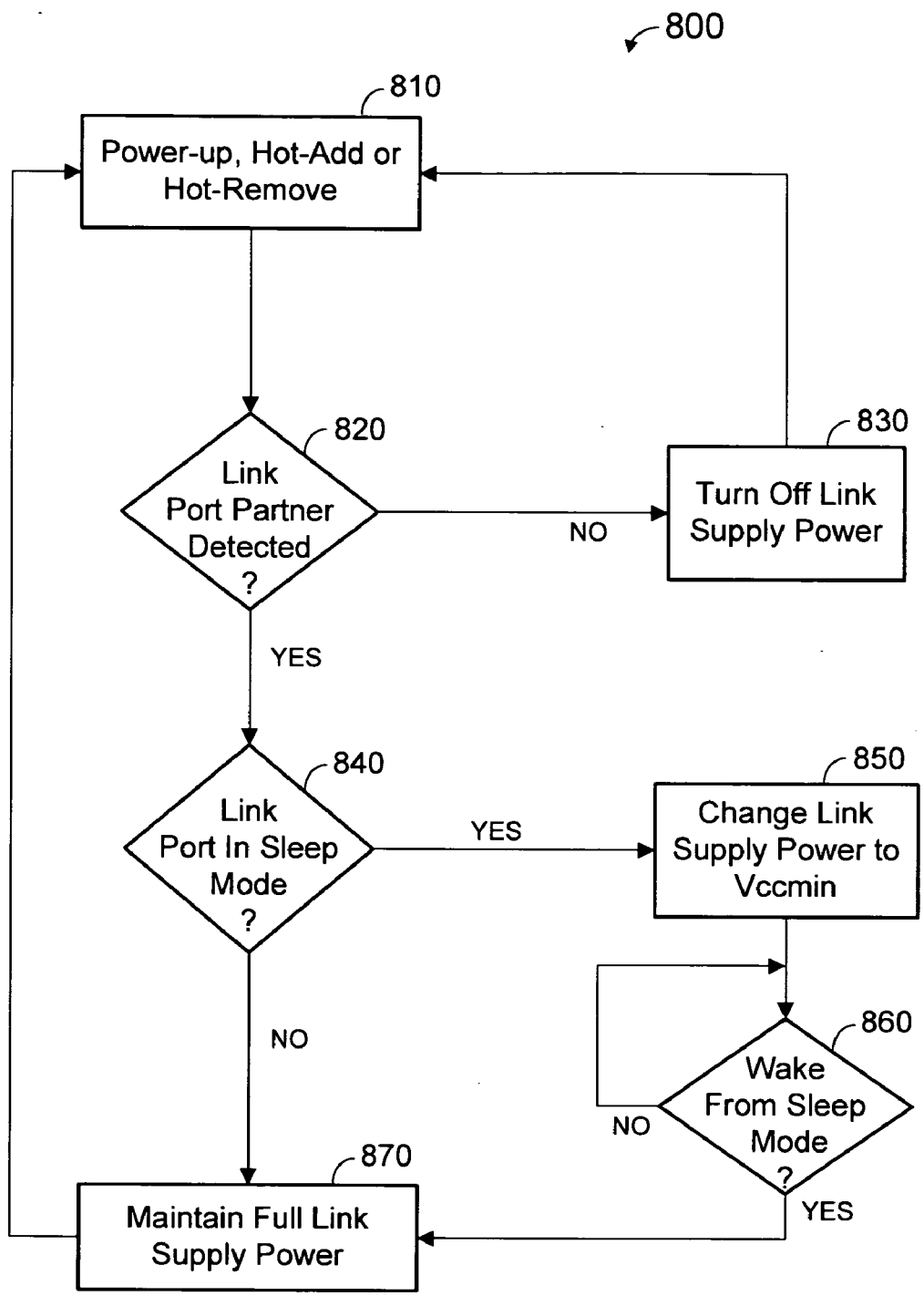
FIG. 8 is a diagram of a process according to some embodiments.

FIG. 8 comprises a flow diagram of process 800 to control a link supply power of a link port based on a detected logical mode according to some embodiments. Process 800 may be performed by any combination of the elements discussed herein and/or by any other suitable elements.

At 810, a system including one or more link ports is powered-up or a device including one or more link ports is hot-added to or hot-removed from a powered-up system. Next at 820, it is determined whether a link port partner is detected. Such detection may be performed by circuit 700 according to some embodiments. If a link port partner is not detected, the link port is determined to be disabled and the link supply power is turned off at 830.

In some embodiments, a switch disposed between a supply power node and the link port is opened at 830. As mentioned above, such action may allow some current to flow from the supply power node $V_{cc}$ to the link port. However, the link supply power may be considered to be "off" if the link supply power is not sufficient to preserve logical states of the link port elements. Flow returns to 810 from 830 to await a next power-up, hot-add or hot-remove event.

Flow proceeds from 820 to 840 if a link port partner is detected. At 840, it is determined whether the link port is in a sleep mode. Some embodiments of 840 comprise determining whether a link between the link port and the detected link port partner is active. 840 may also or alternatively comprise receiving a status of the link from an operating system or firmware agent.

The link supply power is changed at 850 if it is determined that the link port is in a sleep mode. The link supply power is changed to a value that is less than $V_{cc}$ but that is sufficient to maintain the logical states of the link port elements. According to some examples, the value of $V_{cc}$ is 1.1 volt and the changed value (i.e., $V_{ccmin}$) is ~900 millivolts.

Flow cycles at 860, if it is determined therein that the link port is to remain in sleep mode. Flow proceeds therefrom to 870 once it is determined that the link port is to wake from sleep mode. The full link supply power (e.g., $V_{cc}$) is delivered to the link port at 870. Flow returns to 810 from 870.

Figure 9:
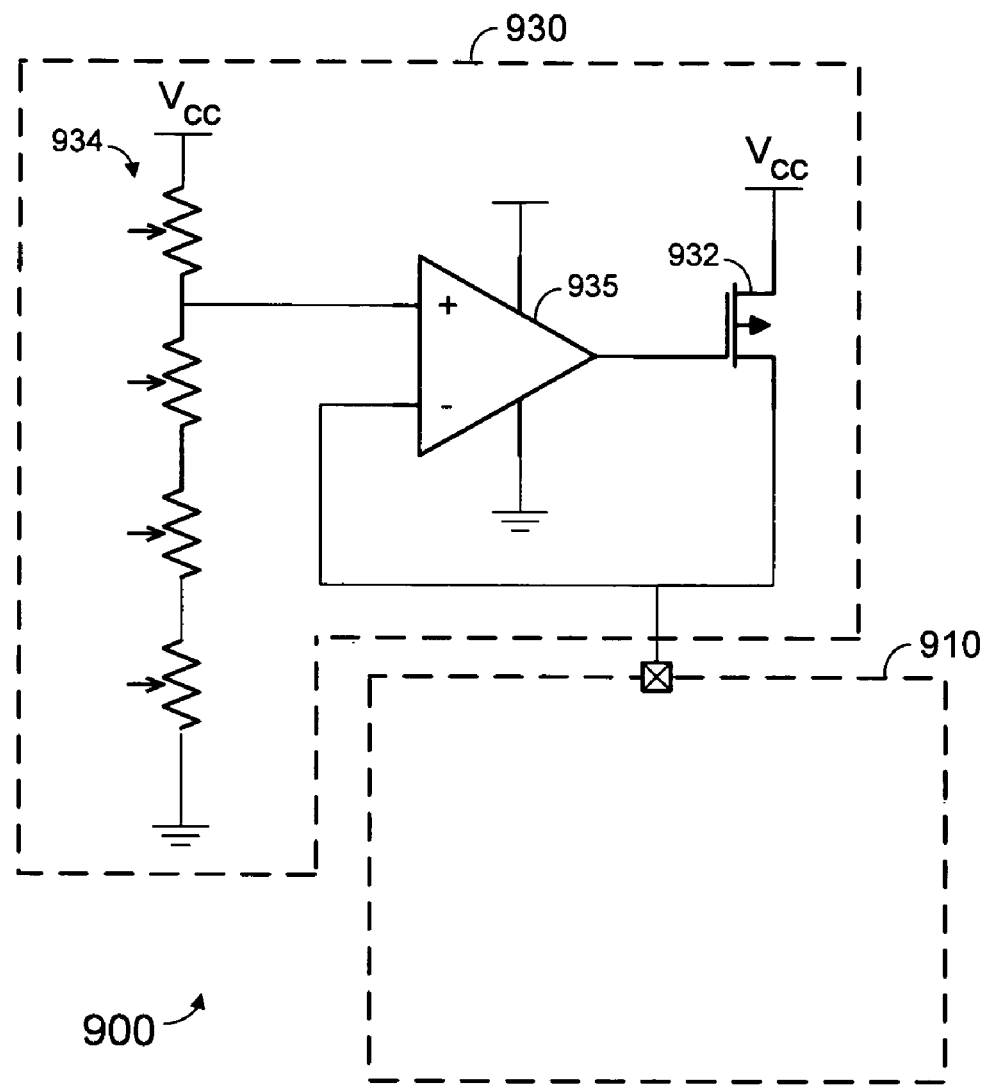
FIG. 9 is a schematic diagram of a circuit to change a link supply power according to some embodiments.

FIG. 9 illustrates system 900 according to some embodiments. System 900 may implement process 800 according to some embodiments. For example, link supply power control circuit 930 may control a supply power provided to a power grid of link port 910 in a case that a logical mode of link port 910 is "disabled", "active" or "sleep".

Circuit 930 is disposed between supply power node $V_{cc}$ and link port 910. Circuit 930 includes switch 932, resistor ladder 934 and amplifier 935. Resistor ladder 934 includes a plurality of programmable taps to select a link supply power. For example, resistor ladder 934 may be programmed to output a signal to switch 932 that will cause switch 932 to open, close, or partially close. Such a signal may therefore control whether a link supply power provided to link port 910 is substantially equal to $V_{cc}$ (if the link port is "active"), is less than $V_{cc}$ but sufficient to maintain the logical states of the link port elements (if the link port is in "sleep" mode), or not sufficient to preserve logical states of the link port elements (if the link port is "disabled").

Figure 10:
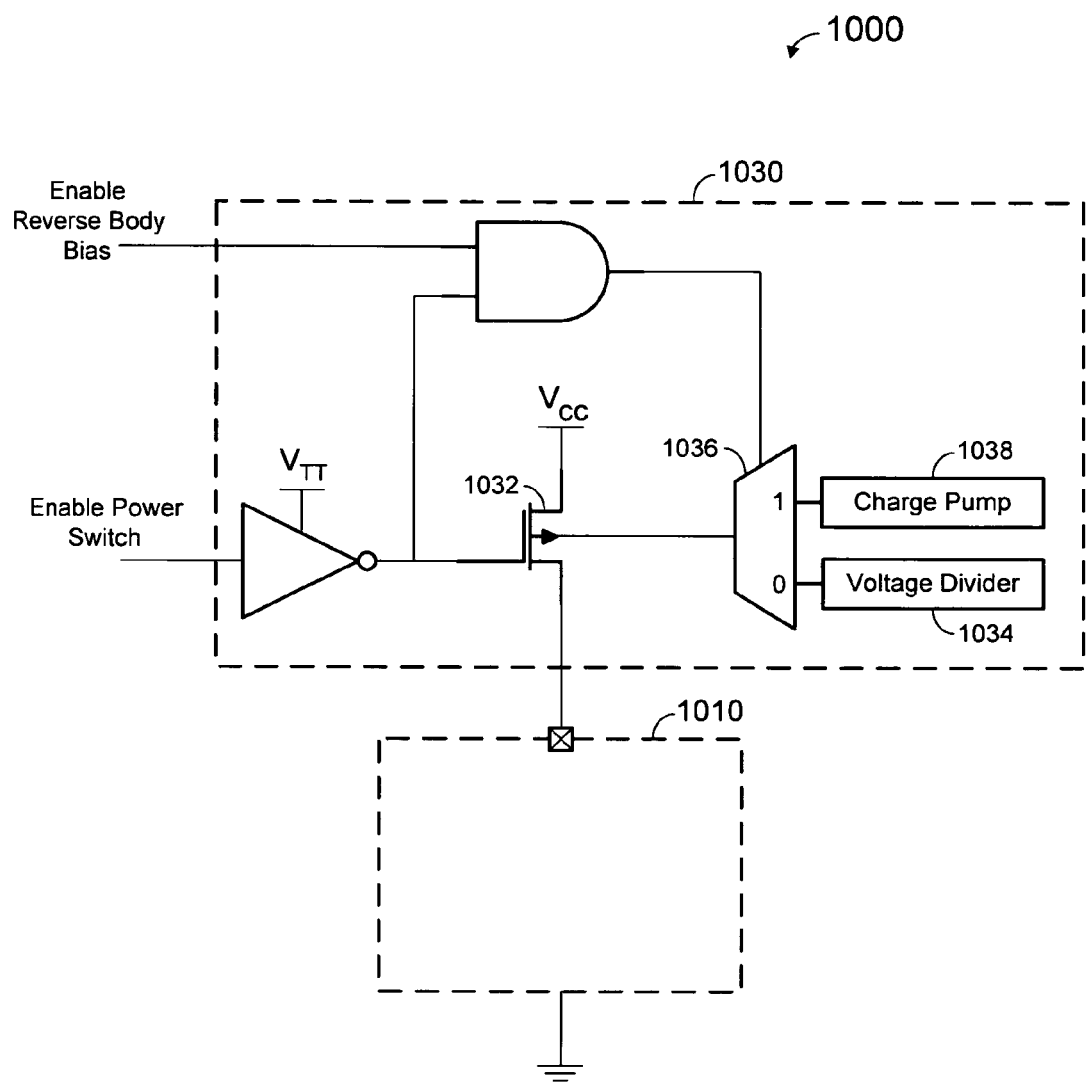
FIG. 10 is a schematic diagram of a circuit to change a link supply power according to some embodiments.

FIG. 10 is a schematic diagram of system 1000 according to some embodiments. System 1000 includes link port 1010 and link supply power control circuit 1030. Link supply power control circuit is intended to reduce leakage through p-channel metal-oxide semiconductor transistor 1032, which is disposed between supply power node $V_{cc}$ and link port 1010.

Circuit 1030 may operate to change a link supply power provided to link port 1010 based on a logical mode of link port 1010. More specifically, circuit 1030 may control transistor 1032 to pass different fractions of $V_{cc}$ to link port 1010 based on the detected logical mode. Circuit 1030 may also selectively apply forward body bias (i.e. current into the body), reverse body bias (i.e., current flow out of the body), or no body bias to transistor 1032 in order to reduce leakage current through transistor 1032.

Circuit 1032 is controlled by an enable reverse body bias signal and an enable power switch signal. These signals may comprise digital signals generated by a state machine of a processor in which system 1000 resides. If link port 1010 is "active", the enable power switch signal is high and the enable reverse body bias signal is low. Accordingly, transistor 1032 is closed and the link supply power is $V_{cc}$. Moreover, voltage divider 1034 is controlled to output $V_{cc}$, which is selected and output by multiplexer 1036 so that no body bias is applied to transistor 1032.

In a case that link port 1010 is in a "sleep" mode, the enable power switch signal remains high and the enable reverse body bias signal remains low. However, voltage divider 1034 is controlled to output $0.9V_{cc}$, which results in a forward body bias of transistor 1032. If the logical mode of link port 1010 is "disabled", the enable power switch signal may be set low and the enable reverse body bias signal may be set high. Such signals cause circuit 1030 to overdrive transistor 1032 to a high voltage (e.g., $V_{TT}$=I/O circuit termination voltage) and to apply a reverse body bias generated by charge pump 1038 to transistor 1032. Benefits of the forward body biasing and reverse body biasing mentioned above may be increased by increasing a channel length of transistor 1032.

A link power supply circuit according to some embodiments may comprise a discrete metal-oxide semiconductor switch mounted on a package, processor card or motherboard. Such a switch may be coupled to a supply power ($V_{cc}$) as described above via dedicated Controlled Collapse Chip Connect bumps and/or package pins. Alternatively, the link power supply circuit may comprise a circuit that receives $V_{cc}$ from such bumps and/or pins and selectively applies a value from $V_{cc}$ to 0 volts to appropriate pins.

Figure 11:
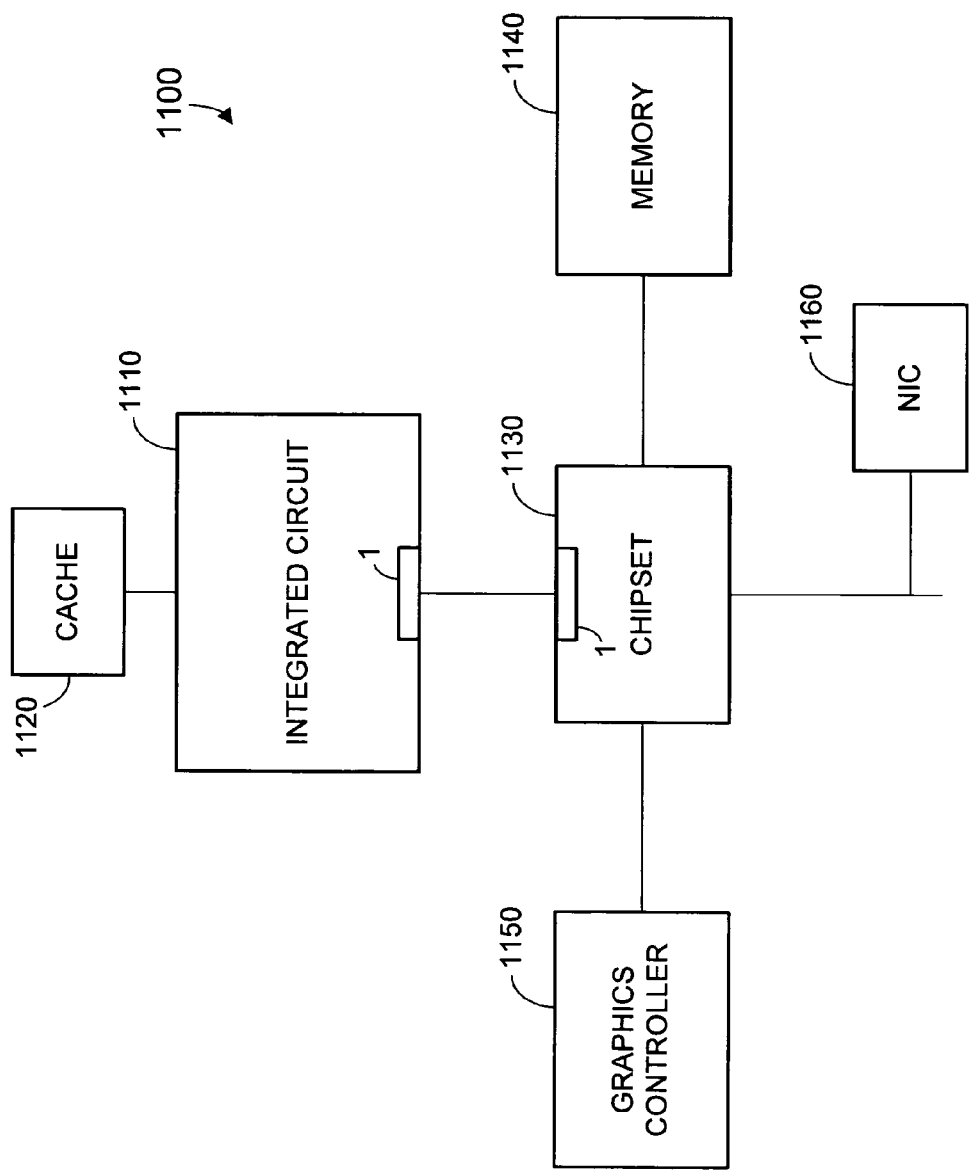
FIG. 11 is a block diagram of a system according to some embodiments.

FIG. 11 illustrates a block diagram of system 1100 according to some embodiments. System 1100 includes integrated circuit 1110 comprising system 1 of FIG. 1. Integrated circuit 1110 may be a microprocessor or another type of integrated circuit. Integrated circuit 1110 communicates with off-die cache 1120 according to some embodiments.

Integrated circuit 1110 may communicate with other elements via a host bus and chipset 1130. In this regard, chipset 1130 also includes an implementation of system 1 to serve as a link partner with system 1 of integrated circuit 1110. Chipset 1130 also communicates with memory 1140, which may comprise any type of memory for storing data, such as a Single Data Rate Random Access Memory, a Double Data Rate Random Access Memory, or a Programmable Read Only Memory. Other functional units, such as graphics controller 1150 and Network Interface Controller (NIC) 1160, may communicate with integrated circuit 1110 via appropriate busses or ports.

The several embodiments described herein are solely for the purpose of illustration. Some embodiments may include any currently or hereafter-known versions of the elements described herein. Therefore, persons in the art will recognize from this description that other embodiments may be practiced with various modifications and alterations.

What is claimed is:

1. A method comprising:
   detecting a logical mode of a link port using a link mode detection circuit;
   changing a link supply power provided to the link port based on the detected logical mode by activating a switch disposed between the link supply power and the link port; and
   applying a reverse body bias to the switch, wherein the detected logical mode is a sleep mode, and wherein changing the link supply power comprises reducing a voltage of the link supply power from $V_{cc}$ to a value that preserves logic states of a plurality of link port elements.

2. A method according to claim 1, wherein detecting a logical mode of a link port comprises at least determining that a link port is not terminated by a link port partner.

3. An apparatus comprising:
   a link port;
   a detector to detect a logical mode of the link port, wherein the detected logical mode is a sleep mode; and
   a circuit comprising a switch disposed between a supply power node and the link port and a second circuit to apply a reverse body bias to the switch, the circuit to change a link supply power provided to the link port based on the detected logical mode, wherein changing the link supply power comprises reducing a voltage of the link supply power from $V_{cc}$ to a value that preserves logic states of a plurality of link port elements.

4. An apparatus according to claim 3, wherein the detector is to determine whether the link port is terminated by a partner link port.

5. An apparatus according to claim 3, wherein the circuit comprises:
   a resistor ladder comprising a plurality of programmable taps to select a link supply power.

6. A system comprising:
   a microprocessor comprising:
      a link port;
      a detector to detect a logical mode of the link port, wherein the detected logical mode is a sleep mode; and
      a circuit comprising a switch disposed between a supply power node and the link port and a second circuit to apply a reverse body bias to the switch, the circuit to change a link supply power provided to the link port based on the detected logical mode, wherein changing the link supply power comprises reducing a voltage of the link supply power from $V_{cc}$ to a value that preserves logic states of a plurality of link port elements; and
   a double data rate memory coupled to the microprocessor.

7. A system according to claim 6, wherein the detector is to determine whether the link port is terminated by a partner link port.

8. A system according to claim 6, wherein the circuit comprises:
   a resistor ladder comprising a plurality of programmable taps to select a link supply power.

* * * * *

UNITED STATES PATENT AND TRADEMARK OFFICE
CERTIFICATE OF CORRECTION

| | | |
|---|---|---|
| PATENT NO. | : 7,669,069 B2 | Page 1 of 1 |
| APPLICATION NO. | : 11/477186 | |
| DATED | : February 23, 2010 | |
| INVENTOR(S) | : Rusu et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 748 days.

Signed and Sealed this

Seventh Day of December, 2010

David J. Kappos
*Director of the United States Patent and Trademark Office*